United States Patent
Roundy et al.

(10) Patent No.: US 10,455,085 B1
(45) Date of Patent: Oct. 22, 2019

(54) SYSTEMS AND METHODS FOR REAL-TIME SCAM PROTECTION ON PHONES

(71) Applicant: Symantec Corporation, Mountain View, CA (US)

(72) Inventors: Kevin Roundy, Culver City, CA (US); Mahmood Sharif, Pittsburgh, PA (US); Acar Tamersoy, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 16/172,674

(22) Filed: Oct. 26, 2018

(51) Int. Cl.
| | |
|---|---|
| *H04M 3/436* | (2006.01) |
| *H04W 4/16* | (2009.01) |
| *H04M 3/22* | (2006.01) |
| *G10L 15/18* | (2013.01) |
| *G10L 17/26* | (2013.01) |
| *H04M 1/57* | (2006.01) |
| *G10L 15/22* | (2006.01) |
| *H04M 3/533* | (2006.01) |

(52) U.S. Cl.
CPC ......... *H04M 3/436* (2013.01); *G10L 15/1815* (2013.01); *G10L 17/26* (2013.01); *H04M 1/571* (2013.01); *H04M 3/2281* (2013.01); *H04W 4/16* (2013.01); *G10L 2015/226* (2013.01); *H04M 3/533* (2013.01)

(58) Field of Classification Search
CPC .... H04M 3/436; H04M 1/571; H04M 3/2281; H04M 3/533; G10L 15/1815; G10L 17/26; G10L 2015/226; H04W 4/16
See application file for complete search history.

(56) References Cited

U.S. PATENT DOCUMENTS

| | | | |
|---|---|---|---|
| 10,110,741 B1 * | 10/2018 | Cohen | H04M 3/436 |
| 2003/0050882 A1 * | 3/2003 | Degen | G06Q 20/10 705/35 |
| 2009/0103701 A1 * | 4/2009 | Garg | H04M 3/436 379/142.04 |
| 2013/0332359 A1 * | 12/2013 | Qteishat | G06Q 20/4014 705/44 |
| 2014/0045456 A1 * | 2/2014 | Ballai | H04W 12/12 455/410 |
| 2015/0339570 A1 * | 11/2015 | Scheffler | G06N 3/10 706/16 |
| 2016/0309038 A1 * | 10/2016 | Cinar | H04L 67/34 |
| 2016/0358115 A1 * | 12/2016 | Gustafson | G06Q 10/06395 |
| 2017/0019534 A1 * | 1/2017 | Qin | H04M 3/436 |

(Continued)

*Primary Examiner* — Christopher M Brandt
(74) *Attorney, Agent, or Firm* — FisherBroyles, LLP (57) ABSTRACT

The disclosed computer-implemented method for using electronic text information to automatically determine untrustworthy voice calls, at least a portion of the method being performed by a computing device comprising at least one processor, may include (1) during a voice call, receiving, by the computing device, text information representing contents of the voice call, (2) analyzing, by the computing device, the text information representing the contents of the voice call, (3) determining, by the computing device, that the voice call is untrustworthy based on the analysis of the text information, and (4) during the voice call, advising a recipient of the voice call of the determination that the voice call is untrustworthy. Various other methods, systems, and computer-readable media are also disclosed.

20 Claims, 7 Drawing Sheets

(56) References Cited

U.S. PATENT DOCUMENTS

| | | | |
|---|---|---|---|
| 2017/0118335 A1* | 4/2017 | Brackett | H04M 3/4365 |
| 2017/0142252 A1* | 5/2017 | Bhupati | H04M 3/2281 |
| 2018/0013881 A1* | 1/2018 | Cooper | H04M 3/2281 |
| 2018/0152558 A1* | 5/2018 | Chan | H04M 3/436 |
| 2019/0130490 A1* | 5/2019 | Durkee | G06Q 40/08 |

* cited by examiner

SYSTEMS AND METHODS FOR REAL-TIME SCAM PROTECTION ON PHONES

BACKGROUND

Phone scams are increasingly common and may cause significant financial cost and emotional distress to its victims. Phone scams may be initiated by scam perpetrators by phone calls and/or voice messages. A victim of a phone scam may often be tricked into providing money, private information, and/or access to the victim's phone to a perpetrator of the phone scam. Hundreds of millions of dollars in total financial losses are attributable to phone scams and the losses are predicted to increase. Phone scams may affect any potential victim with a phone. The perpetrators are often in a different countries and tracking/prosecution of the perpetrators may be difficult.

Phone scams may be difficult to prevent. Existing methods for scam prevention typically involve filtering phone numbers of incoming phone calls based on a database of phone numbers designated as suspicious (e.g., blacklisted). Existing methods may compare a phone number of an incoming phone call against phone numbers that are blacklisted and block the phone call if the phone number matches a blacklisted phone number. Existing methods may not detect scammers that evade detection by spoofing phone numbers, frequently changing spoofed phone numbers, and using spoofed phone numbers that correspond to a geographical area of a targeted victim (e.g., the area code of a spoofed phone number matches the area code of a targeted victim so the targeted victim believes the call is local). Phone scams also cause significant costs for telecommunication carriers that carry the scam voice traffic on their networks and to security companies which provide security services and products to the scam victims.

SUMMARY

As will be described in greater detail below, the instant disclosure describes various systems and methods for real-time scam protection on mobile phones.

In one example, a computer-implemented method for determining that a voice call is untrustworthy may include (1) during a voice call, receiving, by the computing device, text information representing contents of the voice call, (2) analyzing, by the computing device, the text information representing the contents of the voice call, (3) determining, by the computing device, that the voice call is untrustworthy based on the analysis of the text information, and (4) during the voice call, advising a recipient of the voice call of the determination that the voice call is untrustworthy.

In some examples, receiving text information representing the contents of the voice call during the voice call may include recording audio received by the recipient of the voice call, recording audio sent by the recipient of the voice call, and converting the received recorded audio and the sent recorded audio into the text information during the voice call.

In some examples, determining that the voice call is untrustworthy may include analyzing the text information to detect evidence of at least one of a request for payment, money transfer, threatening language, coercive language, keywords associated with fear, or keywords associated with anger.

In some examples, determining that the voice call is untrustworthy may include analyzing the text information to detect sentiments of at least one of distress, intimidation, fear, terror, or anger.

In some examples, determining that the voice call is untrustworthy may include identifying the voice call as a robocall.

In some examples, the recipient may initiate the voice call. The recipient may be a victim of a scam. In some examples, the perpetrator of the scam may contact the victim and leave a message (e.g., a voicemail, a text message, an email, a social media message, etc.) for the victim to contact the scam perpetrator under false pretenses. The recipient (e.g., victim) may, as a result of the content of the message, initiate the call to the scam perpetrator.

In some examples, the computer-implemented method may further include receiving biometric information associated with the recipient of the voice call, analyzing the biometric information to detect sentiments of at least one of distress, intimidation, fear, terror or anger, and determining that the voice call is untrustworthy may be based on the detected sentiments.

In some examples, advising the recipient of the determination that the voice call is untrustworthy during the voice call may include providing the recipient with at least one of a displayed message, a confidence level associated with the classification of the text information, a haptic alert, or an audio message.

In some examples, when the voice call is determined to be untrustworthy, the computer-implemented method may further include intervening an action performed by the recipient of the voice call.

In some examples, the computer-implemented method may further include (1) recording, by the computing device, audio representing the contents of the voice call (2) analyzing, by the computing device, sentiments of the audio representing the contents of the voice call (3) determining, by the computing device, that the voice call is untrustworthy based on the analysis of the sentiments of the audio.

In one embodiment, a system for implementing the above-described method may include at least one physical processor, physical memory comprising a plurality of modules and computer-executable instructions that, when executed by the physical processor, may cause the physical processor to (1) receive text information representing contents of a voice call during the voice call, (2) analyze, by an analysis module, the text information representing the contents of the voice call, (3) determine, by a determination module, the text information representing the contents of the voice call that the voice call is untrustworthy based on the analysis of the text information representing the voice call, and (4) advise, by an advising module, a recipient of the voice call of the determination that the voice call is untrustworthy during the voice call.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive text information representing contents of a voice call during the voice call, (2) analyze the text information representing the contents of the voice call (3) determine the text information representing the contents of the voice call that the voice call is untrustworthy based on the analysis of the text information representing the voice call, and (4) advise a recipient of the voice call of the determination that the voice call is untrustworthy during the voice call.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting whether an incoming voice call is untrustworthy (e.g., a scam). As will be described in greater detail below, by analyzing text transcripts of speech between a caller and a call recipient, the methods described herein may be able to detect whether the caller is untrustworthy and attempting to execute a scam against the call recipient. The analysis of the text transcripts may include natural language processing of the text transcripts of the speech. The analysis may include detecting evidence of keywords and/or phrases in the transcripts that are associated with a scam which may include, without limitation, a request for payment, money transfer, threatening language, coercive language, keywords associated with fear, and/or keywords associated with anger. The analysis may further include detecting evidence of emotions and/or sentiments in the transcripts that are associated with a scam that may include, without limitation, distress, intimidation, fear, terror and/or anger. In some examples, methods described herein may further include advising the call recipient whether the call is a scam during the call so that the call recipient may take action such as terminating the call.

Moreover, the systems and methods described herein may improve computing device security and call recipient security by facilitating the detection of scam calls from untrustworthy callers and notifying the call recipient of the scam. Notifying a call recipient of the scam increases the security of the call recipient by enabling them to take appropriate action and avoid financial loss and emotional distress.

Figure 1:
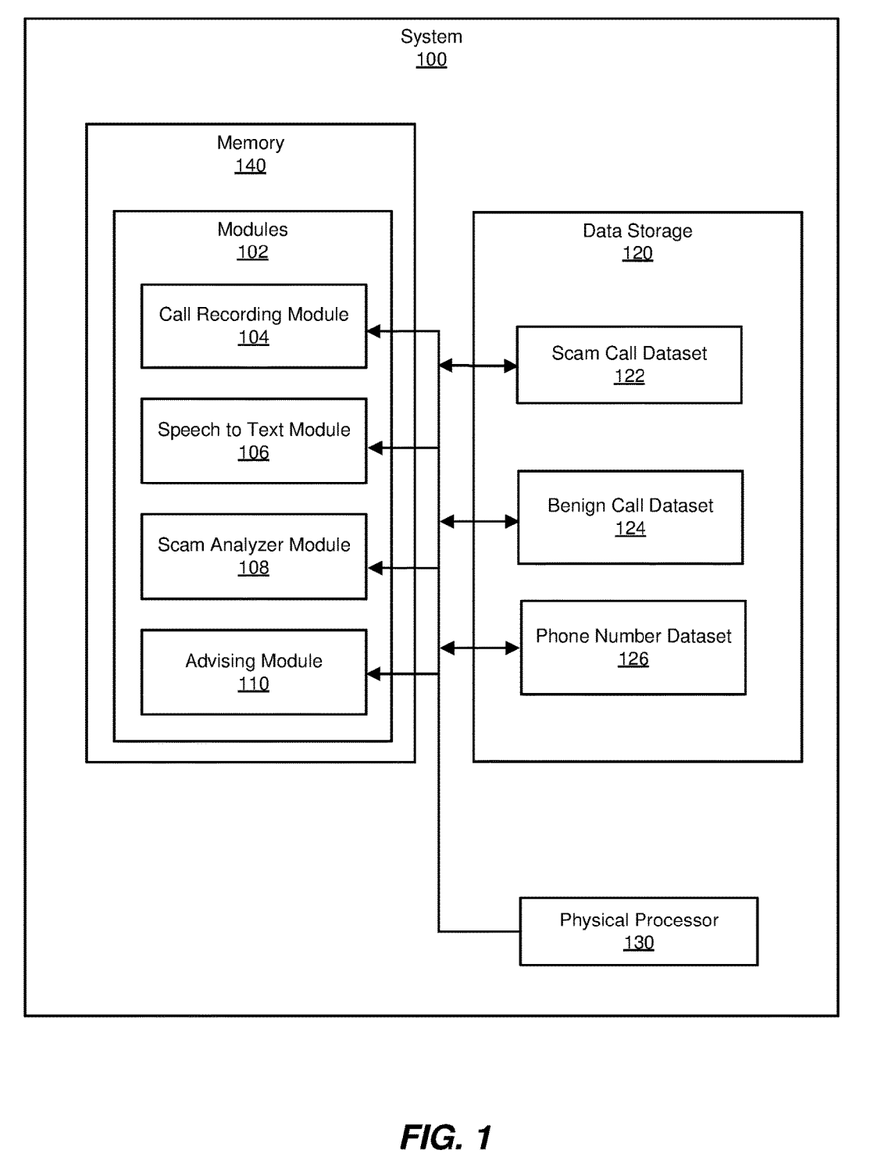
FIG. 1 is a block diagram of an example system for detecting phone scams.
Figure 2:
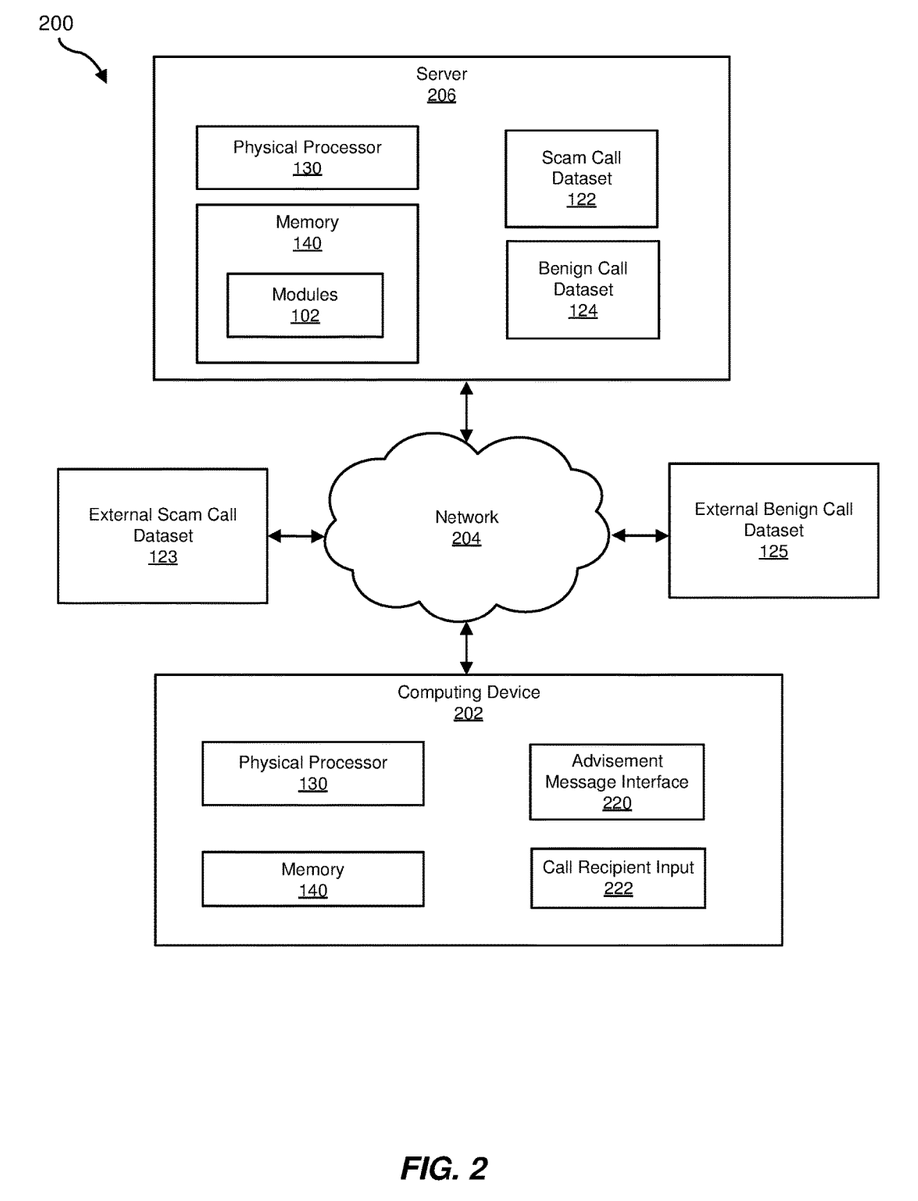
FIG. 2 is a block diagram of an additional example system for detecting phone scams.
Figure 3:
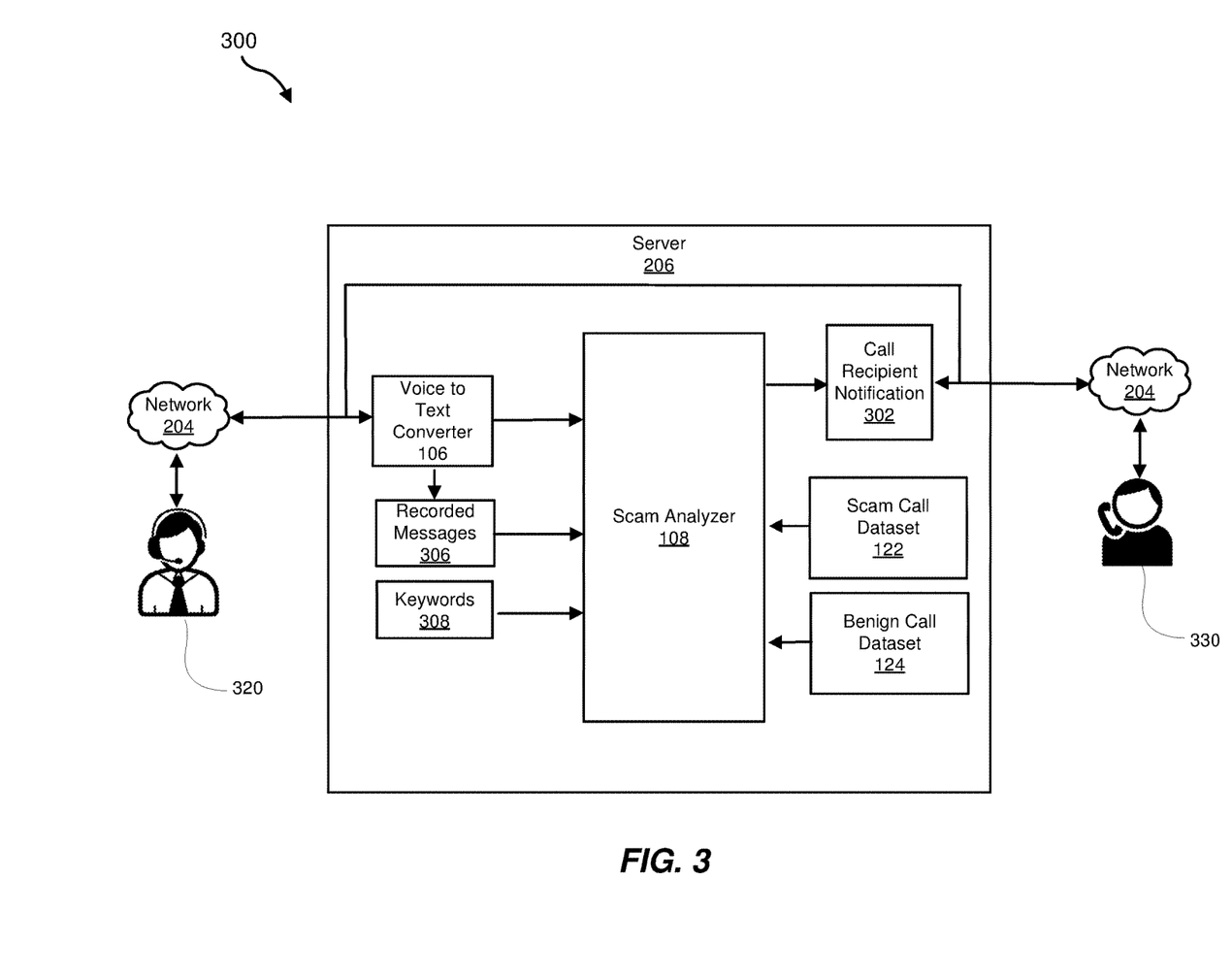
FIG. 3 is a block diagram of an example server for detecting phone scams.

The following will provide, with reference to FIGS. 1-3, detailed descriptions of example systems for detecting scam calls and notifying a call recipient of the scam during the call. Detailed descriptions of an example system for notifying the call recipient of the scam will also be provided in connection with FIG. 4. Detailed descriptions of corresponding computer-implemented methods will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for detecting scam calls. In certain embodiments, one or more of modules 102 in FIG. 1 may represent one or more software applications or programs that, when executed by a computing device, may cause the computing device to perform one or more tasks. For example, and as will be explained in greater detail below, example system 100 may include call recording module 104 for recording the audio sent and received by a call recipient during a call. Example system 100 may additionally include a speech to text module 106 that converts the recorded audio sent and received by a caller and/or call recipient during a call to a text format. Example system 100 may also include scam analyzer module 108 that analyzes transcripts of the text which was converted from speech during a call in order to determine whether the caller is attempting to execute a scam. Example system 100 may additionally include advising module 110 that determines whether to advise the call recipient of the classification of the call and the type of advisement and/or intervention.

For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detection of scam calls. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may include scam call dataset 122, benign call dataset 124, and phone number dataset 126 stored on a server and/or a computing device.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by server 206 and/or any other suitable computing system. As will be described in greater detail below, one or more of modules 102 from FIG. 1 may, when executed by at least one processor of server 206, enable computing device 202 to detect a scam and notify a user of computing device 202 as to whether the call is a scam call. In some examples, computing device 202 may receive call recipient input 222 to acknowledge advisement message 220. Call recipient input 222 that acknowledges advisement message 220 may include, without limitation, pressing a key on computing device 202, pressing an icon on a screen of computing device 202, terminating the call, and/or initiating a call to authorities.

Computing device 202 generally represents any type or form of computing device capable of reading computer-executable instructions. In some embodiments, computing device 202 may represent an endpoint device running software for executing phone calls and providing notifications to a user of computing device 202. Additional examples of computing device 202 include, without limitation, smartphones, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In some examples, server 206 may be a scam detection server for determining whether a phone call is a scam and notifying the call recipient of the determination. Additional examples of server 206 include, without limitation, voice over IP servers, voice over LTE servers, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, a public switched telephone network (PSTN), an intranet, a Wide Area Network (WAN), a Local Area Network (LAN), a Personal Area Network (PAN), the Internet, Power Line Communications (PLC), a cellular network (e.g., a Global System for Mobile Communications (GSM) network, Long Term Evolution (LTE), etc.), portions of one or more of the same, variations or combinations of one or more of the same, and/or any other suitable network.

Scam call dataset 122 generally represents any type or form of data storage for storing transcripts, keywords, combinations of keywords, and/or phrases associated with known scams. In some examples, scam call dataset 122 may be stored in storage hosted on server 206. Scam call dataset 122 may be updated periodically as additional scams are detected and new transcripts, keywords, combinations of keywords, and/or phrases of detected scams are added to scam call dataset 122. Scam call dataset 122 may be updated periodically by adding new transcripts, keywords, combinations of keywords, and/or phrases of detected scams from external scam call dataset 123. External scam call dataset 123 may be a dataset compiled and managed by a third party and may further include phone numbers of known scammers (e.g., blacklist). Server 206 may access external scam call dataset 123 periodically over network 204.

Benign call dataset 124 generally represents any type or form of data storage for storing transcripts, keywords, combinations of keywords, and/or phrases associated with benign calls (e.g. normal conversations) that are known to not be associated with scams. In some examples, benign call dataset 124 may be stored in storage hosted on server 206. Benign call dataset 124 may be updated periodically by adding new transcripts, keywords, combinations of keywords, and/or phrases from external benign call dataset 125. External benign call dataset 125 may be a dataset compiled and managed by a third party (e.g., wireless phone carrier) and may further include phone numbers of trusted callers (e.g., whitelist). Server 206 may access external benign call dataset 125 periodically over network 204. In some examples, transcripts of benign (e.g., non-scam) conversations and scam conversations may be recorded and stored after one or more parties to the conversation have provided consent to recording.

Advisement message interface 220 within computing device 202 generally represents any type or form of interface which provides advisement of determination of a scam call. In some examples, advisement message interface 220 may be a display interface to provide a call recipient with a displayed message indicating a call is a scam. Advisement message interface 220 may be a haptic interface on computing device 202 which provides haptic feedback (e.g., mechanical or vibratory feedback) to provide a call recipient with an indication that a call is a scam. Advisement message interface 220 may be an audio interface on computing device 202 which provides audio feedback (e.g., audio feedback through a speaker of computing device 202) to provide a call recipient with an audio message indicating a call is a scam.

FIG. 3 is a block diagram of an example system 300 for detecting scam calls. As shown in FIG. 3 server 206 may include components utilized in detecting scam calls. In some examples, caller 320 may initiate a voice call to call recipient 330. The voice call may be established over network 204. During the call, caller 320 may converse with call recipient 330. Caller 320 may be, without limitation, a non-scammer, a scammer, an agent for a scammer (e.g., call center agent), a recording of a scammer, and/or a robocall (e.g., an automated phone call that delivers a recorded message). Call recipient 330 may desire protection from scam calls and have a desire to know if caller 320 is attempting to execute a scam. In some examples, call recipient 330 may execute an input event (e.g., push a key on the phone, open an application on the phone, initiate a 3-way call, initiate a scam call menu on the phone, etc.) to trigger scam analyzer 108 to perform a scam analysis and detection on the call. Call recipient 330 may provide explicit or implied consent to record the call when executing the input event. In some examples, call recipient 330 may configure a setting in the call recipient's phone which automatically triggers scam analyzer 108 to perform a scam detection on the call without call recipient intervention or input event. Configuring a setting in the call recipient's phone which automatically triggers scam analyzer 108 to perform a scam detection on the call without call recipient intervention or input event may also provide consent to record the call.

In some examples, voice to text converter 106 may convert the spoken audio of caller 320 into a transcript in text format. Voice to text converter 106 may convert the spoken audio of call recipient 330 into a transcript in text format separately from the transcript of caller 320. Server 206 may include voice to text converter 106. In some examples, a computing device other than server 206 may include voice to text converter 106 and may convert the audio into text of both caller 320 and call recipient 330 and transmit the transcripts of the call to server 206.

In some examples, scam analyzer 108 may analyze the transcripts of the call to determine if the call is a scam call. Scam analyzer 108 may analyze the transcripts of caller 320 and call recipient 330 individually and/or in combination with one another. When scam analyzer 108 determines the call is a scam, call recipient notification 302 may send a message to notify call recipient 330 that the call is a scam. Call recipient notification 302 may send a message to notify call recipient 330 that the call is a scam in real-time and with minimal latency so that call recipient 330 may take appropriate actions.

In some examples, scam analyzer 108 may analyze the transcripts of the call using natural language processing. Scam analyzer 108 may analyze the transcripts of the call in the English language and/or in multiple languages other than English. Scam analyzer 108 may automatically detect the language of the call. In some examples, natural language processing executing in scam analyzer 108 may extract key metadata from the text transcripts, including, without limitation, caller and/or call recipient identities, purported relationships, concepts, sentiment, and emotion. In a training stage, scam analyzer 108 may be trained to detect keywords 308 commonly associated with known scams based on training data including information that indicates keywords 308. Scam analyzer 108 may use a trained model to compare the text transcripts of the conversation to keywords 308 and/or phrases associated with scams. Scam analyzer 108 may also use a trained model to compare the text transcripts of the conversation to scripted scam. In some examples, keywords 308 and phrases associated with scams may include, without limitation, Western Union®, PayPal®, request for payment, money transfer, insurance, car accident, gunpoint, money order, bank account, hostage, ransom, social security number, threatening language, coercive language, keywords associated with fear, keywords associated with anger, etc. The dataset of keywords 308 may be built and adjusted over time using machine learning techniques.

In some examples, scam analyzer 108 may analyze the transcripts of the call using natural language processing to determine the sentiments and/or emotions of the caller 320 and/or call recipient 330. In some examples, natural language processing executing in scam analyzer 108 may extract keywords from the text transcripts to determine sentiment, and/or emotion. In a training stage, scam analyzer 108 may be trained to detect keywords 308 which are associated with emotions and sentiments which are commonly experienced during scam calls. Scam analyzer 108 may use a trained model to compare the text transcripts of the conversation to the keywords 308 and phrases associated with emotions and sentiments commonly experienced during scam calls. In some examples, scam analyzer 108 may detect sentiments of distress, intimidation, fear, terror, and/or anger to determine whether a call is a scam. In some examples, scam analyzer 108 may analyze audio recorded during the voice call. Scam analyzer 108 may analyze audio recorded during the voice call, alternatively or in addition to, analyzing text transcripts of the voice call. Scam analyzer 108 may analyze audio recorded during the voice call to determine sentiments of the caller and/or the call recipient during the call. Scam analyzer 108 may use a trained model to compare the recorded audio of the call to audio associated with emotions and sentiments commonly experienced during scam calls. In some examples, scam analyzer 108 may detect sentiments of distress, intimidation, fear, terror, and/or anger in the recorded audio to determine whether a call is a scam.

In some examples, scam analyzer 108 may determine a confidence level corresponding to the probability that a call is a scam. Scam analyzer 108 may determine the confidence level based on variables including, without limitation, sentiment analysis of the call transcripts, keyword analysis of the call transcripts, phone number identification of the caller, demographics of the call recipient, and/or stress level of the call recipient. Scam analyzer 108 may determine different responses to the call based on the determined confidence level. The responses may be based on different thresholds of the confidence level.

In some examples, call recipient 330 may receive a voice mail message and desire to determine if the voicemail message is a scam. Call recipient 330 may forward the voicemail to server 206. Server 206 may convert the voicemail to a text transcript in voice to text converter 106 and store the transcript of the voicemail in recorded messages 306. The transcript of the voicemail may be analyzed using natural language processing as described above to determine whether the voice mail is associated with a scam. Call recipient notification 302 may provide a message notifying call recipient 330 whether the voicemail is a scam.

In some examples, call recipient 330 may receive a pop-up audio message during an internet browsing session and desire to determine if the audio message is a scam. Call recipient 330 may record the audio message and forward the audio message to server 206. Server 206 may convert the audio message to a text transcript in voice to text converter 106 and store the transcript of the audio message in recorded messages 306. The transcript of the audio message may be analyzed using natural language processing as described above to determine whether the audio message is associated with a scam. Call recipient notification 302 may provide a message notifying call recipient 330 whether the audio message is a scam.

In some examples, scam analyzer 108 may receive biometric information from call recipient 330. The biometric information may include, without limitation, body temperature, heartrate, blood pressure, and other biometric measures. Scam analyzer 108 may use the biometric information in determining whether the call is a scam. For example, if the biometric information indicates that call recipient 330 is under stress, the confidence level that the call is a scam may increase. The call recipient 330 biometric information may be provided from sensors associated with call recipient 330.

Figure 4:
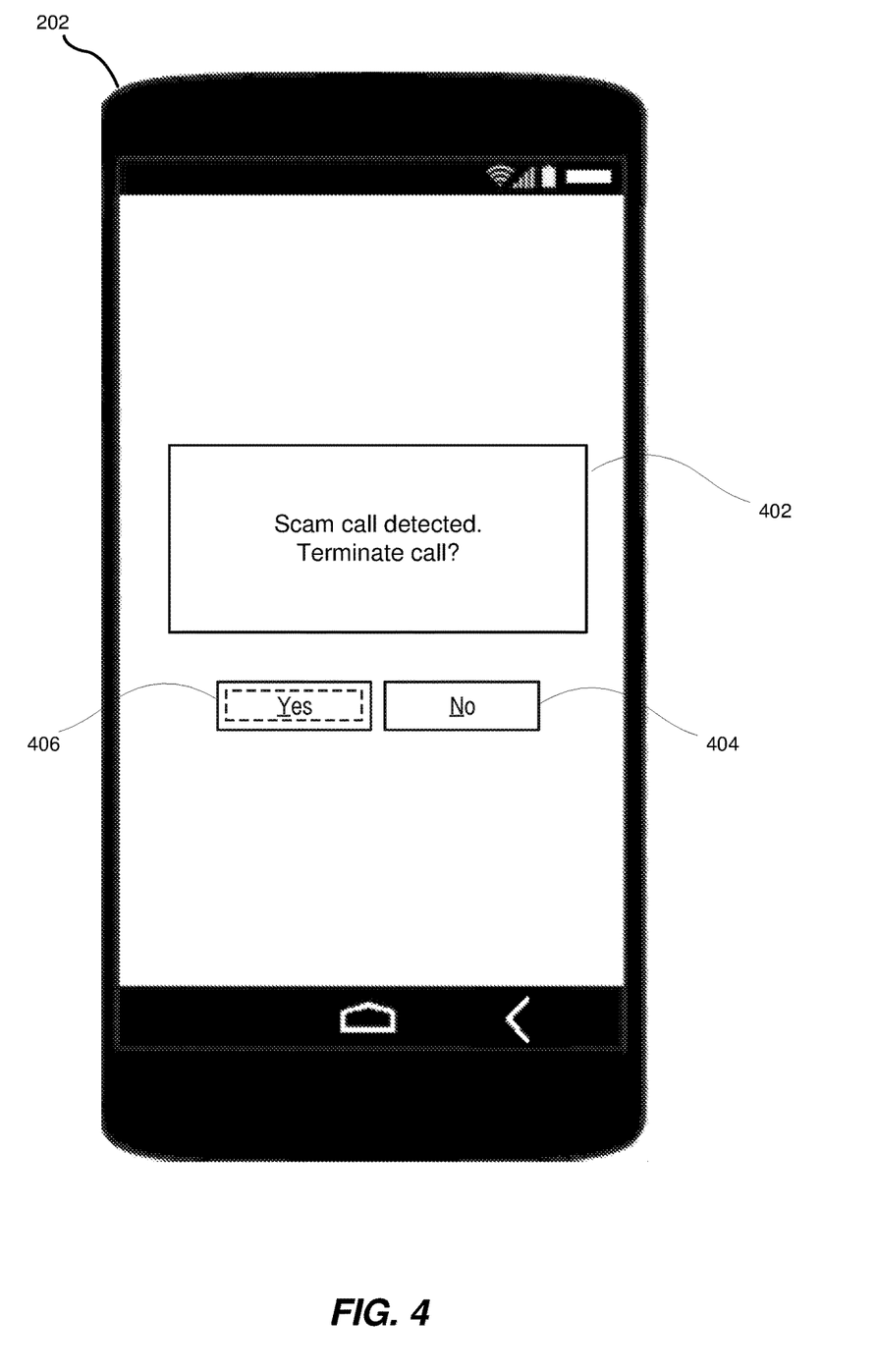
FIG. 4 is an example method for notifying a call recipient of a phone scam.

FIG. 4 illustrates a notification message displayed on a computing device. As shown in FIG. 4 computing device 202 may display notification message 402. Notification message 402 may be displayed to a call recipient during a voice call. Notification message 402 may be sent by call recipient notification 302. Notification message 402 may include a message indicating that the current voice call has been determined to be a scam call. Computing device 202 may display a message asking the call recipient whether to terminate the call. If the call recipient decides to terminate the call, the call recipient may press icon 406 labeled "Yes". If the call recipient decides not to terminate the call, the call recipient may press icon 404 labeled "No". In some examples, when a scam call is detected an intervention may be executed. The intervention may include, without limitation, displaying a message advising the call recipient not to make any payments, displaying a message advising the call recipient how to further determine whether the call is a scam, displaying a message asking the call recipient to contact the appropriate authorities to report the scam. In some examples, computing device 202 may automatically terminate the call, and/or computing device 202 may automatically contact the appropriate authorities to report the scam.

Figure 5:
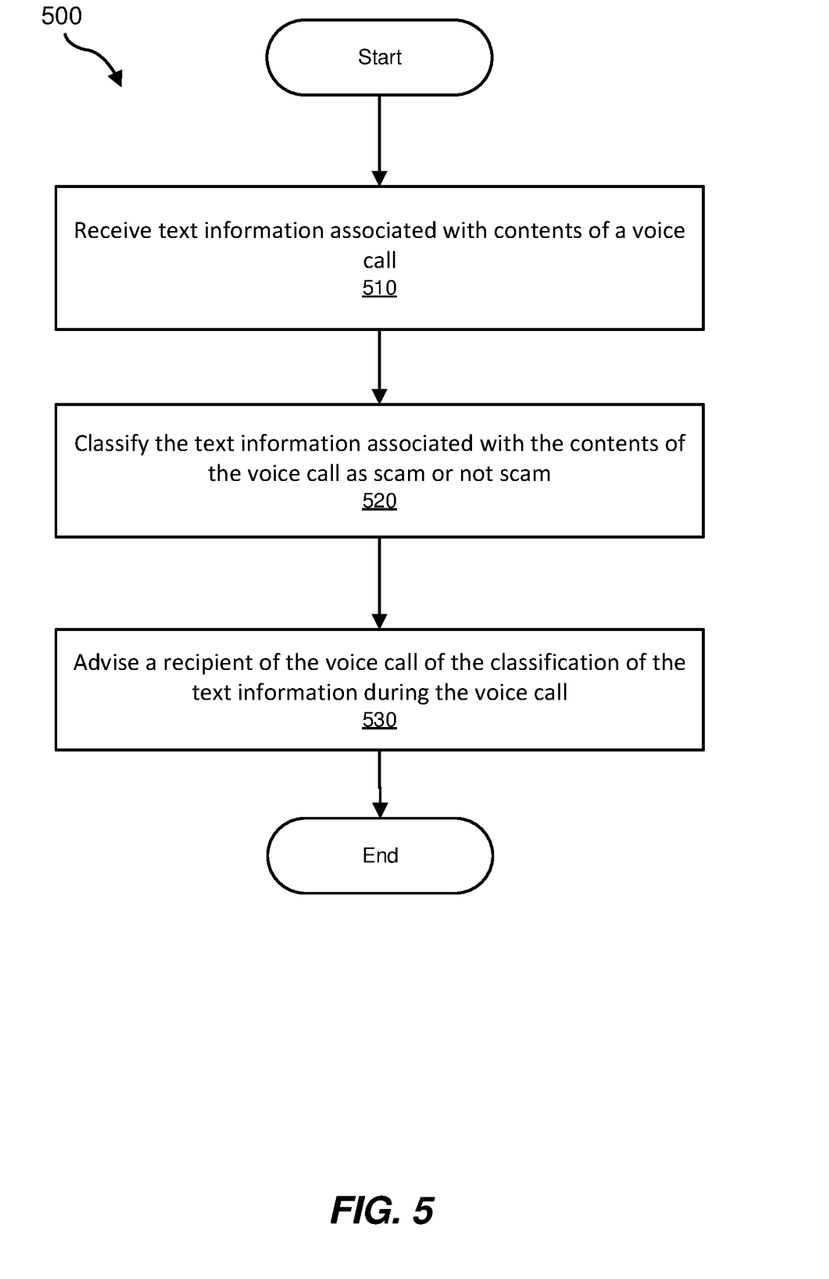
FIG. 5 is an example flowchart of a method of detecting phone scams.

FIG. 5 is a flow diagram of an example computer-implemented method 500 for detecting scam calls. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may receive text information representing contents of a voice call. For example, voice to text converter 106 may, as part of server 206 in FIG. 3, receive text information representing contents of a voice call.

At step 520, one or more of the systems described herein may classify the text information representing the contents of the voice call as scam or not scam. For example, scam analyzer 108 may, as part of server 206 in FIGS. 2 and 3, classify the text information representing the contents of the voice call as scam or not scam.

At step 530, one or more of the systems described herein may advise a recipient of the voice call of the classification of the text information during the voice call. For example, call recipient notification 302 may, as part of server 206 in FIG. 3, advise a recipient of the voice call of the classification of the text information during the voice call.

Figure 6:
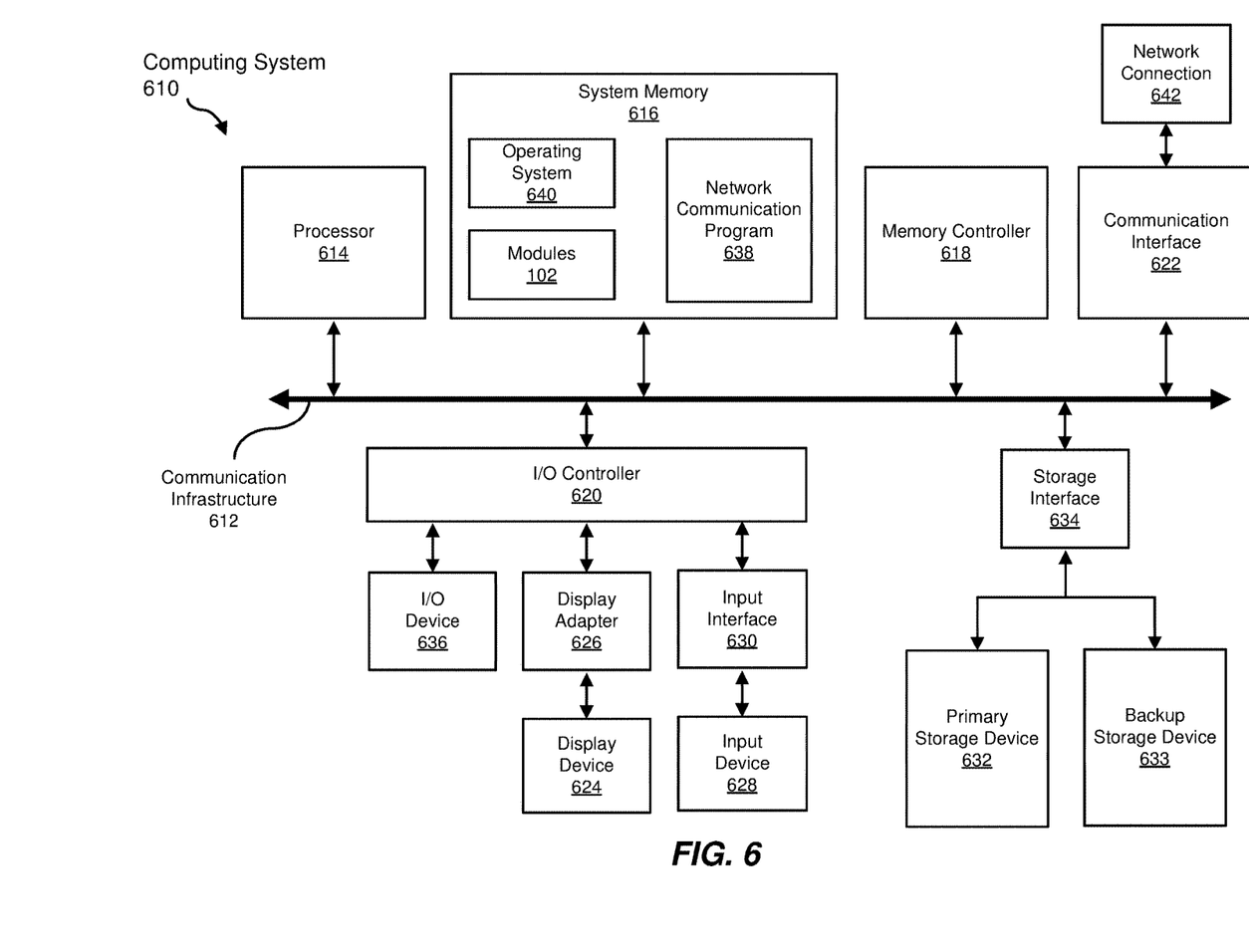
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 5). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
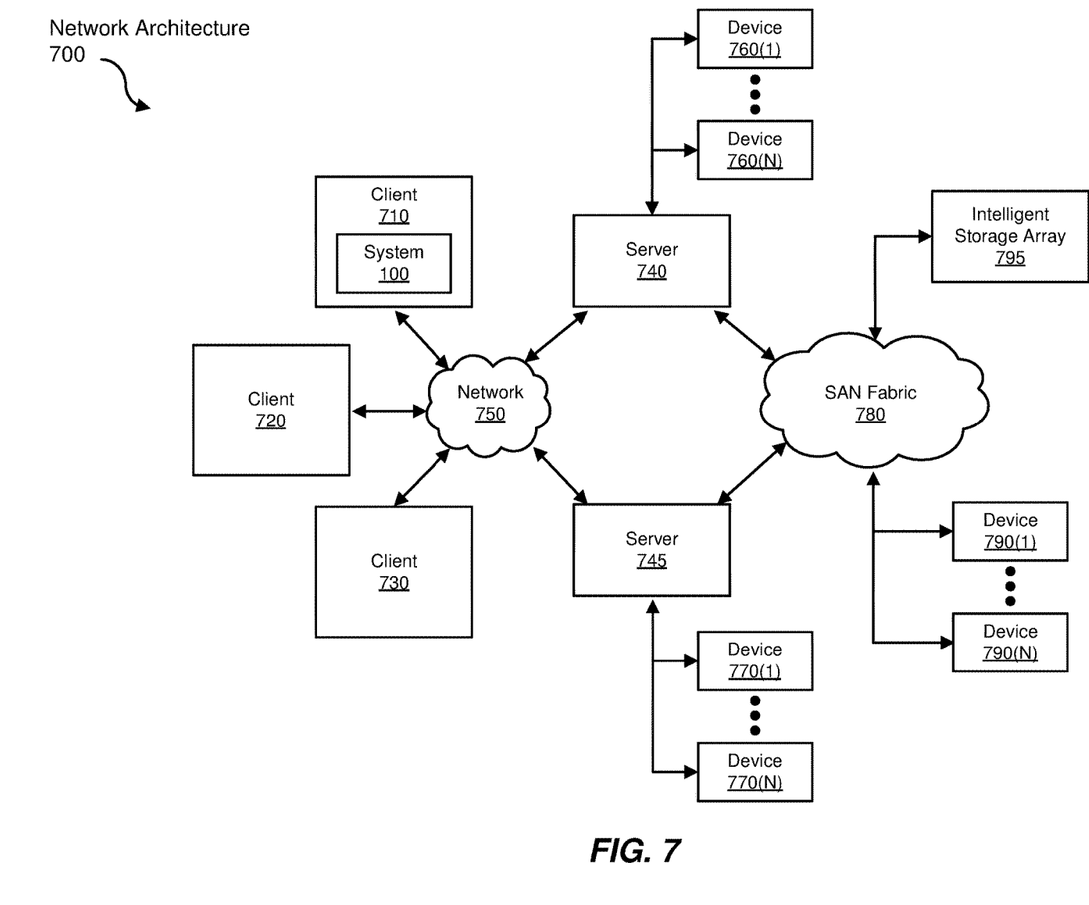
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 5). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for multi-factor authentication for seamless website logins.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for using electronic text information to automatically determine untrustworthy voice calls, at least a portion of the method being performed by a computing device comprising at least one processor, the method comprising:
   during a voice call, receiving, by the computing device, text information representing contents of the voice call;
   analyzing, by the computing device, the text information representing the contents of the voice call;
   determining, by the computing device, that the voice call is untrustworthy based on the analysis of the text information, wherein the analysis of the text information includes detecting evidence of at least one of a request for payment or a request for money transfer; and
   during the voice call, advising a recipient of the voice call of the determination that the voice call is untrustworthy.

2. The computer-implemented method of claim 1, wherein receiving the text information representing the contents of the voice call during the voice call comprises:
   recording audio received by the recipient of the voice call;
   recording audio sent by the recipient of the voice call; and
   converting the received recorded audio and the sent recorded audio into the text information during the voice call.

3. The computer-implemented method of claim 1, wherein determining that the voice call is untrustworthy comprises:
   analyzing the text information to detect evidence of at least one of threatening language, coercive language, keywords associated with fear, or keywords associated with anger.

4. The computer-implemented method of claim 1, wherein determining that the voice call is untrustworthy comprises analyzing the text information to detect sentiments of at least one of distress, intimidation, fear, terror, or anger.

5. The computer-implemented method of claim 1, wherein determining that the voice call is untrustworthy comprises identifying the voice call as a robocall.

6. The computer-implemented method of claim 1, wherein the recipient initiates the voice call.

7. The computer-implemented method of claim 1, further comprising:
   receiving biometric information associated with the recipient of the voice call; and
   wherein determining that the voice call is untrustworthy comprises:
   analyzing the biometric information to detect sentiments of at least one of distress, intimidation, fear, terror or anger.

8. The computer-implemented method of claim 1, wherein advising the recipient of the voice call of the determination that the voice call is untrustworthy during the voice call comprises providing the recipient with at least one of a displayed message, a confidence level associated with the classification of the text information, a haptic alert, or an audio message.

9. The computer-implemented method of claim 1, wherein, when the voice call is determined to be untrustworthy, the method further comprises intervening an action performed by the recipient of the voice call.

10. The computer-implemented method of claim 1, further comprising:
    recording, by the computing device, audio representing the contents of the voice call;
    analyzing, by the computing device, sentiments of the audio representing the contents of the voice call; and
    determining, by the computing device, that the voice call is untrustworthy based on the analysis of the sentiments of the audio.

11. A system for determining that a voice call is untrustworthy, the system comprising:
    at least one physical processor;
    physical memory comprising a plurality of modules and computer-executable instructions that, when executed by the physical processor, cause the physical processor to:
    receive text information representing contents of the voice call during the voice call;
    analyze, by an analyzing module, the text information representing the contents of the voice call;
    determine, by a determination module, the text information representing the contents of the voice call that the voice call is untrustworthy based on the analysis of the text information, wherein the analysis of the text information includes detecting evidence of at least one of a request for payment or a request for money transfer; and
    advise, by an advising module, a recipient of the voice call of the determination that the voice call is untrustworthy during the voice call.

12. The system of claim 11, wherein receiving text information representing the contents of the voice call comprises:
    recording audio received by the recipient of the voice call;
    recording audio sent by the recipient of the voice call; and
    converting the received recorded audio and the sent recorded audio into the text information.

13. The system of claim 11, wherein determining that the voice call is untrustworthy comprises:
    analyzing the text information to detect evidence of at least one of threatening language, coercive language, keywords associated with fear, or keywords associated with anger.

14. The system of claim 11, wherein determining that the voice call is untrustworthy comprises analyzing the text information to detect sentiments of at least one of distress, intimidation, fear, terror, or anger.

15. The system of claim 11, wherein determining that the voice call is untrustworthy comprises identifying the voice call as a robocall.

16. The system of claim 11, wherein the recipient initiates the voice call.

17. The system of claim 11, further comprising:

receiving biometric information associated with the recipient of the voice call; and wherein determining that the voice call is untrustworthy comprises:

analyzing the biometric information to detect sentiments of at least one of distress, intimidation, fear, terror or anger.

18. The system of claim 11, wherein advising the recipient of the voice call of the determination that the voice call is untrustworthy during the voice call comprises providing the recipient with at least one of a displayed message, a confidence level associated with the classification of the text information, a haptic alert, or an audio message.

19. The system of claim 11, wherein, when the voice call is determined to be untrustworthy, the method further comprises intervening an action performed by the recipient of the voice call.

20. A non-transitory computer-readable medium comprising one or more computer-executable instructions that, when executed by at least one processor of a computing device, cause the computing device to:

receive text information representing contents of a voice call during the voice call;

analyze the text information representing the contents of the voice call;

determine, based on analyzing the text information representing the contents of the voice call that the voice call is untrustworthy, wherein the analysis of the text information includes detecting evidence of at least one of a request for payment or a request for money transfer; and advise a recipient of the voice call of the determination that the voice call is untrustworthy during the voice call.

\* \* \* \* \*